(12) United States Patent
Edholm et al.

(10) Patent No.: US 8,744,065 B2
(45) Date of Patent: Jun. 3, 2014

(54) METHOD AND SYSTEM FOR MONITORING CONTACT CENTER TRANSACTIONS

(75) Inventors: Philip Edholm, Pleasanton, CA (US); Keith Weiner, Scottsdale, AZ (US)

(73) Assignee: Avaya Inc., Basking Ridge, NJ (US)

(*) Notice: Subject to any disclaimer, the term of this patent is extended or adjusted under 35 U.S.C. 154(b) by 281 days.

(21) Appl. No.: 12/887,734

(22) Filed: Sep. 22, 2010

(65) Prior Publication Data

US 2012/0069986 A1    Mar. 22, 2012

(51) Int. Cl.
*H04M 3/00* (2006.01)
*H04M 5/00* (2006.01)

(52) U.S. Cl.
USPC ...... 379/265.06; 381/17; 381/61; 379/202.01

(58) Field of Classification Search
USPC .......................... 379/265.06, 202.01–206.01, 379/265.01–265.03, 266.01; 381/17, 18, 381/61, 63, 365, 386, 387; 370/260, 266; 455/414.1, 414.4, 415, 416
See application file for complete search history.

(56) References Cited

U.S. PATENT DOCUMENTS

| | | | |
|---|---|---|---|
| 4,650,929 A | 3/1987 | Boerger et al. | |
| 4,734,934 A | 3/1988 | Boggs et al. | |
| 5,020,098 A | 5/1991 | Celli | |
| 5,113,431 A | 5/1992 | Horn | |
| 5,533,112 A | 7/1996 | Danneels | |
| 5,539,741 A | 7/1996 | Barraclough et al. | |
| 5,790,635 A * | 8/1998 | Dezonno | 379/32.04 |
| 5,889,843 A | 3/1999 | Singer et al. | |
| 6,011,851 A * | 1/2000 | Connor et al. | 381/17 |
| 6,125,115 A | 9/2000 | Smits | |
| 6,178,237 B1 | 1/2001 | Horn | |
| 6,219,045 B1 | 4/2001 | Leahy et al. | |
| 6,241,612 B1 | 6/2001 | Heredia | |
| 6,327,567 B1 | 12/2001 | Willehadson et al. | |
| 6,330,022 B1 | 12/2001 | Seligmann | |
| 6,408,327 B1 | 6/2002 | McClennon et al. | |
| 6,501,739 B1 | 12/2002 | Cohen | |

(Continued)

FOREIGN PATENT DOCUMENTS

| | | |
|---|---|---|
| CN | 1703065 A | 11/2005 |
| EP | 0762717 A2 | 3/1997 |

(Continued)

OTHER PUBLICATIONS

International Search Report for PCT/IB2010/002384 mailed Feb. 2, 2011, 10 pages.

(Continued)

*Primary Examiner* — Oleg Asanbayev
(74) *Attorney, Agent, or Firm* — Withrow & Terranova, PLLC

(57) ABSTRACT

A method and system for concurrently monitoring contact center agents. A user interface executes on a supervisor station and displays multiple agent identifiers, including a first agent identifier and a second agent identifier, on a display device. The supervisor station provides to a three-dimensional spatial audio engine (3DSAE) first audio attribute data identifying a location of the first agent identifier in the user interface with respect to a supervisor reference position, the first audio attribute data including first audio direction data and first audio distance data. The supervisor station receives from the 3DSAE first voice signals corresponding to the first agent identifier, wherein the first voice signals include aural characteristics based on the first audio attribute data, and presents the first voice signals to an output port.

10 Claims, 12 Drawing Sheets

(56) References Cited

U.S. PATENT DOCUMENTS

| | | | |
|---|---|---|---|
| 6,539,087 | B1 | 3/2003 | Walsh et al. |
| 6,559,863 | B1 | 5/2003 | Megiddo |
| 6,657,975 | B1 | 12/2003 | Baxley et al. |
| 6,675,054 | B1 | 1/2004 | Ruberg |
| 6,807,563 | B1 | 10/2004 | Christofferson et al. |
| 6,813,360 | B2 | 11/2004 | Gentle |
| 6,839,417 | B2 | 1/2005 | Weisman et al. |
| 6,850,496 | B1 | 2/2005 | Knappe et al. |
| 6,879,565 | B2 | 4/2005 | Baxley et al. |
| 6,959,075 | B2 | 10/2005 | Cutaia et al. |
| 6,985,571 | B2 | 1/2006 | O'Malley et al. |
| 7,006,616 | B1 | 2/2006 | Christofferson et al. |
| 7,111,049 | B1 | 9/2006 | Granger et al. |
| 7,180,997 | B2 | 2/2007 | Knappe |
| 7,181,690 | B1 | 2/2007 | Leahy et al. |
| 7,194,084 | B2 | 3/2007 | Shaffer et al. |
| 7,412,392 | B1 | 8/2008 | Satapathy |
| 7,418,090 | B2 | 8/2008 | Reding et al. |
| 7,456,858 | B2 | 11/2008 | Schrader et al. |
| 7,466,334 | B1 | 12/2008 | Baba |
| 7,908,320 | B2 | 3/2011 | Ludwig et al. |
| 7,933,226 | B2 | 4/2011 | Woodruff et al. |
| 7,995,732 | B2 | 8/2011 | Koch et al. |
| 8,005,023 | B2 | 8/2011 | Li et al. |
| 8,059,599 | B1 | 11/2011 | Rogers et al. |
| 8,315,366 | B2 * | 11/2012 | Basart et al. ............ 379/142.01 |
| 8,351,589 | B2 * | 1/2013 | Acero et al. ............ 379/202.01 |
| 2002/0013813 | A1 | 1/2002 | Matsuoka |
| 2002/0020951 | A1 | 2/2002 | Choi |
| 2002/0181721 | A1 | 12/2002 | Sugiyama et al. |
| 2003/0021400 | A1 | 1/2003 | Grandgent et al. |
| 2003/0112947 | A1 | 6/2003 | Cohen |
| 2003/0117531 | A1 | 6/2003 | Rovner et al. |
| 2003/0174657 | A1 | 9/2003 | Qin |
| 2003/0234859 | A1 | 12/2003 | Malzbender et al. |
| 2004/0047461 | A1 | 3/2004 | Weisman et al. |
| 2004/0052218 | A1 * | 3/2004 | Knappe ............... 379/202.01 |
| 2004/0101120 | A1 | 5/2004 | O'Malley et al. |
| 2004/0113252 | A1 | 6/2004 | Vonstaudt |
| 2004/0190700 | A1 | 9/2004 | Cutaia et al. |
| 2004/0240652 | A1 | 12/2004 | Kanada |
| 2005/0053214 | A1 | 3/2005 | Reding et al. |
| 2005/0062843 | A1 | 3/2005 | Bowers et al. |
| 2005/0181872 | A1 | 8/2005 | Acharya et al. |
| 2005/0271194 | A1 | 12/2005 | Woods et al. |
| 2005/0280701 | A1 | 12/2005 | Wardell |
| 2006/0067500 | A1 | 3/2006 | Christofferson et al. |
| 2006/0104458 | A1 | 5/2006 | Kenoyer et al. |
| 2007/0071204 | A1 | 3/2007 | Kanada |
| 2007/0133436 | A1 | 6/2007 | Provino et al. |
| 2007/0279484 | A1 | 12/2007 | Derocher et al. |
| 2008/0037749 | A1 | 2/2008 | Metzger et al. |
| 2008/0144794 | A1 | 6/2008 | Gardner |
| 2008/0144876 | A1 | 6/2008 | Reining et al. |
| 2008/0260131 | A1 | 10/2008 | Akesson |
| 2009/0086949 | A1 | 4/2009 | Caspi et al. |
| 2009/0220064 | A1 | 9/2009 | Gorti et al. |
| 2010/0020951 | A1 | 1/2010 | Basart et al. |
| 2010/0073454 | A1 | 3/2010 | Lovhaugen et al. |
| 2010/0158203 | A1 | 6/2010 | Mikan et al. |
| 2011/0077755 | A1 | 3/2011 | Yoakum et al. |

FOREIGN PATENT DOCUMENTS

| | | |
|---|---|---|
| EP | 1954019 A1 | 8/2008 |
| GB | 2303516 A | 2/1997 |
| WO | 9941880 A1 | 8/1999 |
| WO | 0048379 A1 | 8/2000 |
| WO | 2004095822 A1 | 11/2004 |
| WO | 2010046736 A1 | 4/2010 |
| WO | 2011036543 A1 | 3/2011 |

OTHER PUBLICATIONS

Search Report for United Kingdom Patent Application No. 1119805.8 issued Mar. 14, 2012, 2 pages.
Notice of Allowance for U.S. Appl. No. 12/564,262 mailed Nov. 25, 2011, 10 pages.
Non-final Office Action for U.S. Appl. No. 12/564,262 mailed Aug. 16, 2011, 7 pages.
Non-final Office Action for U.S. Appl. No. 11/233,773 mailed Oct. 25, 2011, 37 pages.
Advisory Action for U.S. Appl. No. 11/233,773 mailed Aug. 9, 2011, 3 pages.
Final Office Action for U.S. Appl. No. 11/233,773 mailed Jun. 6, 2011, 42 pages.
Non-final Office Action for U.S. Appl. No. 11/233,773 mailed Dec. 28, 2010, 38 pages.
Advisory Action for U.S. Appl. No. 11/233,773 mailed Nov. 9, 2010, 3 pages.
Final Office Action for U.S. Appl. No. 11/233,773 mailed Jun. 22, 2010, 37 pages.
Non-final Office Action for U.S. Appl. No. 11/233,773 mailed Oct. 28, 2009, 38 pages.
Final Office Action for U.S. Appl. No. 11/233,773 mailed May 11, 2009, 34 pages.
Non-final Office Action for U.S. Appl. No. 11/233,773 mailed Sep. 16, 2008, 31 pages.
Final Office Action for U.S. Appl. No. 11/983,616 mailed Apr. 11, 2012, 17 pages.
Non-final Office Action for U.S. Appl. No. 11/983,616 mailed Sep. 28, 2011, 14 pages.
Non-final Office Action for U.S. Appl. No. 12/569,931 mailed Aug. 3, 2012, 16 pages.
Benford, S., et al., "Managing Mutual Awareness in Collaborative Virtual Environments," Proceedings VRST '94, Aug. 1994, ACM Press, Singapore, 14 pages.
Damer, B., "Avatars!: Exploring and Building Virtual Worlds on the Internet (excerpts)", Peachpit Press, Berkeley, 1998, 158 pages.
No Author, "Digital Space Traveler User Guide," The Digital Space Commons, Chapters 1-8, http://www.digitalspace.com/traveler/DigitalSpaceTravelerUserGuide.pdf, 46 pages.
McCarthy, S., "PC users step through their screens via OnLive!," Telephony Online, Sep. 9, 1996, accessed May 27, 2007, http://telephonyonline.com/mag/telecom_pc_users_step/, 2 pages.
No Author, "OnLive! Products," OnLive! Technologies, Inc., accessed May 22, 2007, http://web.archive.org/web/19970714193742/http://www.onlive.com/prod/, 3 pages.
Liesenborgs, J., "Voice over IP in networked virtual environments," Maastricht University Doctoral Thesis, 1999-2000 Academic Year, Title Page, Table of Contents and Chapters 6 and 10, 18 pages.
Eubank, W., "Summer Internet World '97, McCormick Place, Chicago, Illinois, Jul. 21-25, 1997", Aug. 1, 1996, updated Aug. 1, 1997, http://www.eubank-web.com/William/Articles/world97.htm, 5 pages.
No Author, "3D Conferencing White Paper," DiamondWare, May 19, 2005, 7 pages.
No Author, "3D Audio through the Internet," DiamondWare, May 15, 2005, 7 pages.
No Author, "Out With the Old, In With Palantir," DiamondWare, Sep. 28, 2003, 2 pages.
Final Office Action for U.S. Appl. No. 11/233,773 mailed Jun. 27, 2012, 49 pages.
Notice of Allowance for U.S. Appl. No. 12/555,413 mailed Aug. 17, 2012, 9 pages.
Non-final Office Action for U.S. Appl. No. 12/948,140 mailed Oct. 24, 2012, 18 pages.
Final Office Action for U.S. Appl. No. 12/948,140 mailed May 7, 2013, 18 pages.
Advisory Action for U.S. Appl. No. 12/948,140 mailed Jul. 11, 2013, 3 pages.
Notice of Allowance for U.S. Appl. No. 12/569,931 mailed May 28, 2013, 7 pages.
Final Office Action for U.S. Appl. No. 12/569,931 mailed Dec. 19, 2012, 16 pages.

(56) References Cited

OTHER PUBLICATIONS

Non-Final Office Action for U.S. Appl. No. 11/983,616, mailed Feb. 5, 2014, 19 pages.
Examiner's Answer for U.S. Appl. No. 12/948,140, mailed Jan. 16, 2014, 6 pages.
Office Action for Chinese Patent Application No. 201080030095.1, mailed Dec. 23, 2013, 11 pages.
Office Action for Chinese Patent Application No. 201080030095.1, mailed Dec. 23, 2013, 15 pages (English Translation).

* cited by examiner

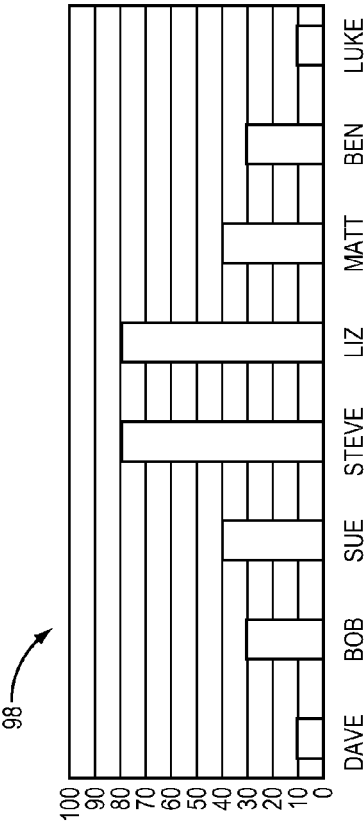
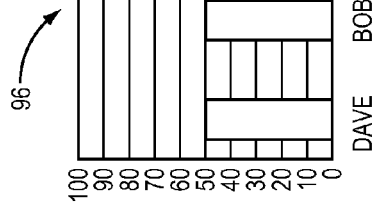
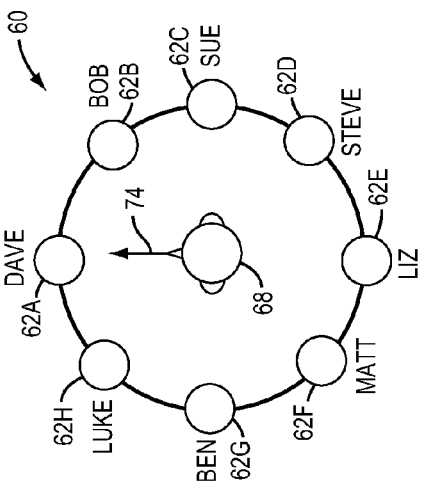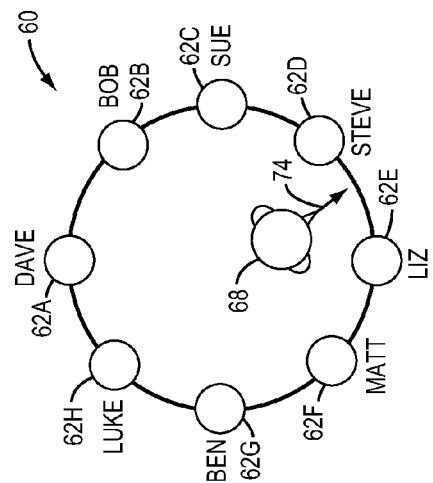
FIG. 8A
FIG. 8B

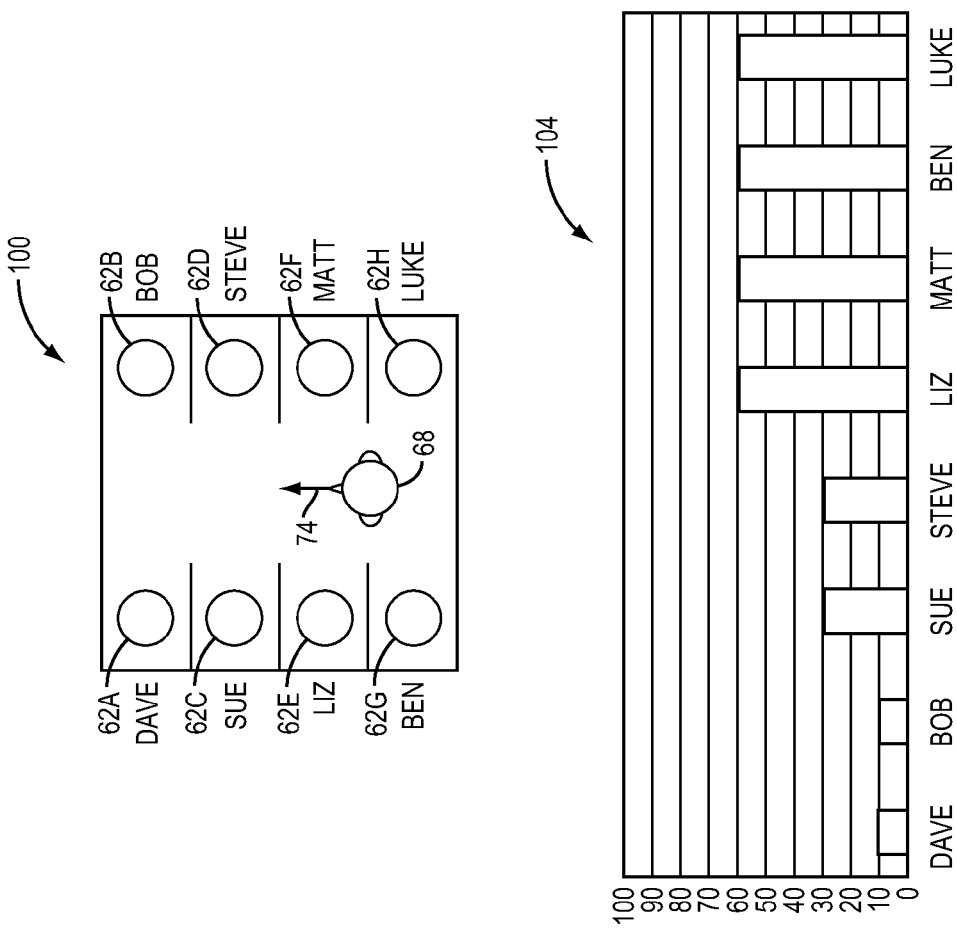

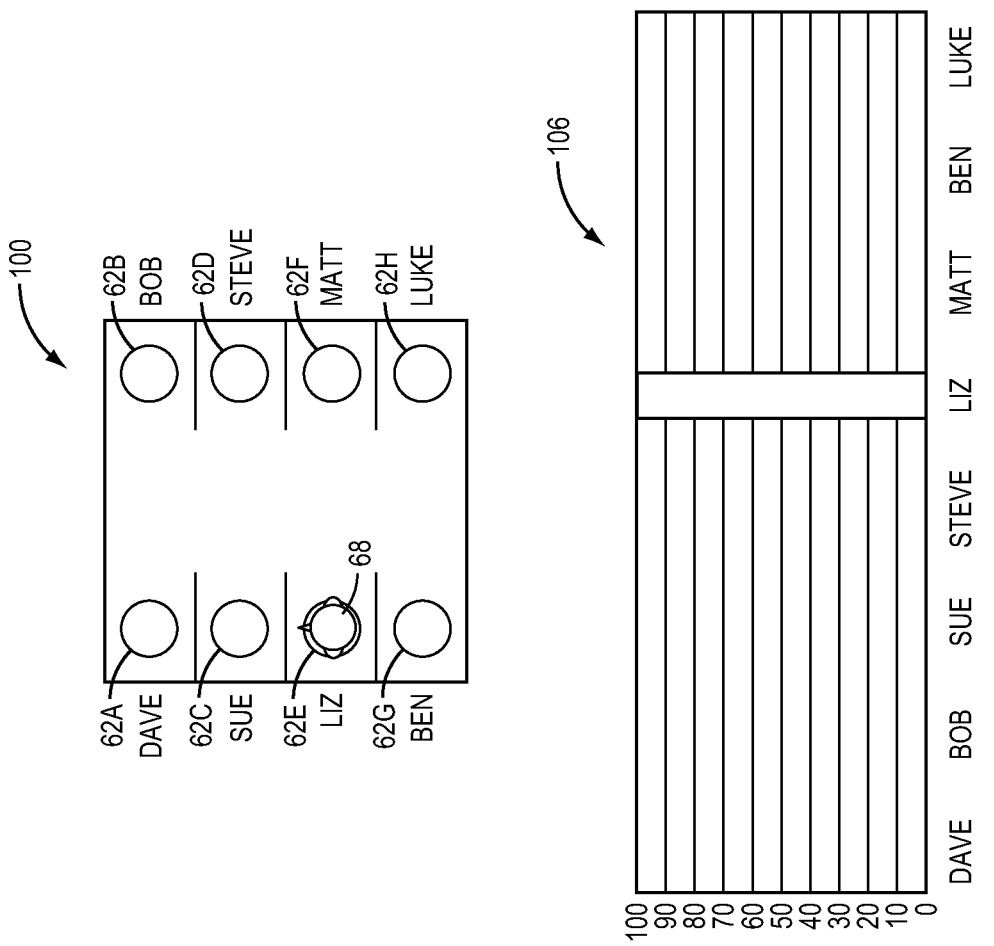

METHOD AND SYSTEM FOR MONITORING CONTACT CENTER TRANSACTIONS

FIELD OF THE DISCLOSURE

The present disclosure relates to contact centers, and in particular to concurrently monitoring multiple contact center agents.

BACKGROUND

Commercial enterprises frequently use contact centers to provide services such as technical support to customers. A caller typically initiates a contact center transaction by dialing a manufacturer-provided telephone number for help with a problem. After answering certain questions posed by an interactive voice response system, the caller is typically connected to a particular contact center agent based on the caller's answers. The contact center agent begins a dialog with the caller and hopefully resolves the caller's problem.

Not long ago a supervisor may have monitored contact center agents by physically walking in proximity to an agent's station and listening to at least the agent's side of the call. Alternately, the supervisor may have had the ability to listen in on any particular agent's conversation via telecommunications equipment, such as a multi-line telephone, which allowed the supervisor to select a particular agent's telephone line. However, today the supervisor typically uses computer tools that monitor the state of each of the agents (e.g., time in a call, type of transaction) and then listens in to agent calls if they exceed certain parameters. Also, it is increasingly likely that contact center agents are located in a different location from their supervisor, making it more difficult for a supervisor to monitor contact center transactions. Both situations inhibit the ability of the supervisor to listen to multiple agents concurrently to detect difficulties or stress in their interactions as an indicator of their need for attention.

Humans detect a location of a sound through differences in the phase and frequency of sound waves that are received simultaneously by each ear. Essentially, in the real world, all sounds are stereo, or multi-channel. This ability to distinguish distance and direction of a sound enables a human to concurrently process multiple sounds simultaneously. For example, when supervisors strolled around cubicles in the past, they could simultaneously hear multiple agents speaking, and discern which agent said what based on the direction and distance of the agent's voice. Unlike in nature, most electronic voice communications are single-channel, or monaural, and thus there is no ability for a listener to distinguish a particular location, or position, of a voice in relation to their own perspective. This is apparent, for example, in a voice conference where a listener may hear multiple individuals speaking concurrently, and to the listener, each individual sounds as if they are at the same location. Studies have shown it is difficult for the human brain to assimilate multiple concurrent conversations in a monaural environment.

A stereo headset, or multiple speakers, in conjunction with multi-channel audio signals enables different audio signals to be received by each ear. Multi-channel sound is used in certain applications, such as computer gaming environments and virtual reality environments, to enable a participant in such environments to generally distinguish the location of sounds occurring during participation in the environment.

It would greatly improve supervisor monitoring of contact center agents if a contact center supervisor could concurrently listen to multiple agents via a communication channel, without leaving the supervisor's desk, such that each agent's voice was perceived to be originating from a unique position with respect to the supervisor. It would also greatly improve supervisor monitoring if the supervisor could easily and intuitively position each agent's voice, and volume, at a desired location with respect to the supervisor.

SUMMARY

Embodiments disclosed herein relate to monitoring multiple contact center agents concurrently. In one embodiment, a media server facilitates and anchors contact center transactions associated with multiple contact center agents. For each contact center transaction, the media server receives voice signals generated by a respective agent and the caller being helped by the agent. The media server continually provides the voice signals to a supervisor conference processor associated with a supervisor. The conference processor provides the voice signals to a supervisor station, where they can be heard in real time by the supervisor using an audio device, such as a headset.

The supervisor station includes a user interface in which agent identifiers, such as graphical icons, which correspond to the contact center agents, are displayed. The supervisor may manipulate the user interface to alter the distance between a supervisor reference position of the user interface and the agent identifiers. For each agent identifier in the user interface the supervisor station determines audio attribute data that includes audio direction data and audio distance data. The audio direction data identifies a direction of the agent identifier in the user interface with respect to a supervisor reference direction. The audio distance data identifies a distance of the agent identifier with respect to a supervisor reference location in the user interface.

The supervisor station provides the audio attribute data to a three-dimensional spatial audio engine (3DSAE) in the media server. The supervisor conference processor also provides the voice signals of the agents to the 3DSAE. The 3DSAE modifies the voice signals that correspond to each contact center agent to include aural characteristics, such as phase and frequency attributes, which aurally position the respective voice signals at the direction and distance identified in the corresponding audio attribute data. The modified voice signals are provided to the supervisor station. The supervisor station sends the voice signals to an output port which is coupled to a multi-channel listening device, such as a stereo headset. The supervisor hears the agents' voices originating from locations based on the location of corresponding agent identifiers with respect to the supervisor reference position in the user interface.

The supervisor may, using an input device such as a mouse, alter the location of one or more agent identifiers with respect to the supervisor reference position. When this occurs, the supervisor station determines new audio attribute data for each agent identifier, and provides the new audio attribute data to the 3DSAE. The 3DSAE modifies the voice signals of the contact center agents based on the new audio attribute data and provides the modified voice signals to the supervisor conference processor, which in turn provides the voice signals to the supervisor station.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIGS. 8A and 8B illustrate exemplary changes in relative volume of agents based on different audio distance data associated with agent identifiers;

FIGS. 9A-9C illustrate another exemplary user interface for facilitating the monitoring of agents by the supervisor.

DETAILED DESCRIPTION OF THE PREFERRED EMBODIMENTS

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
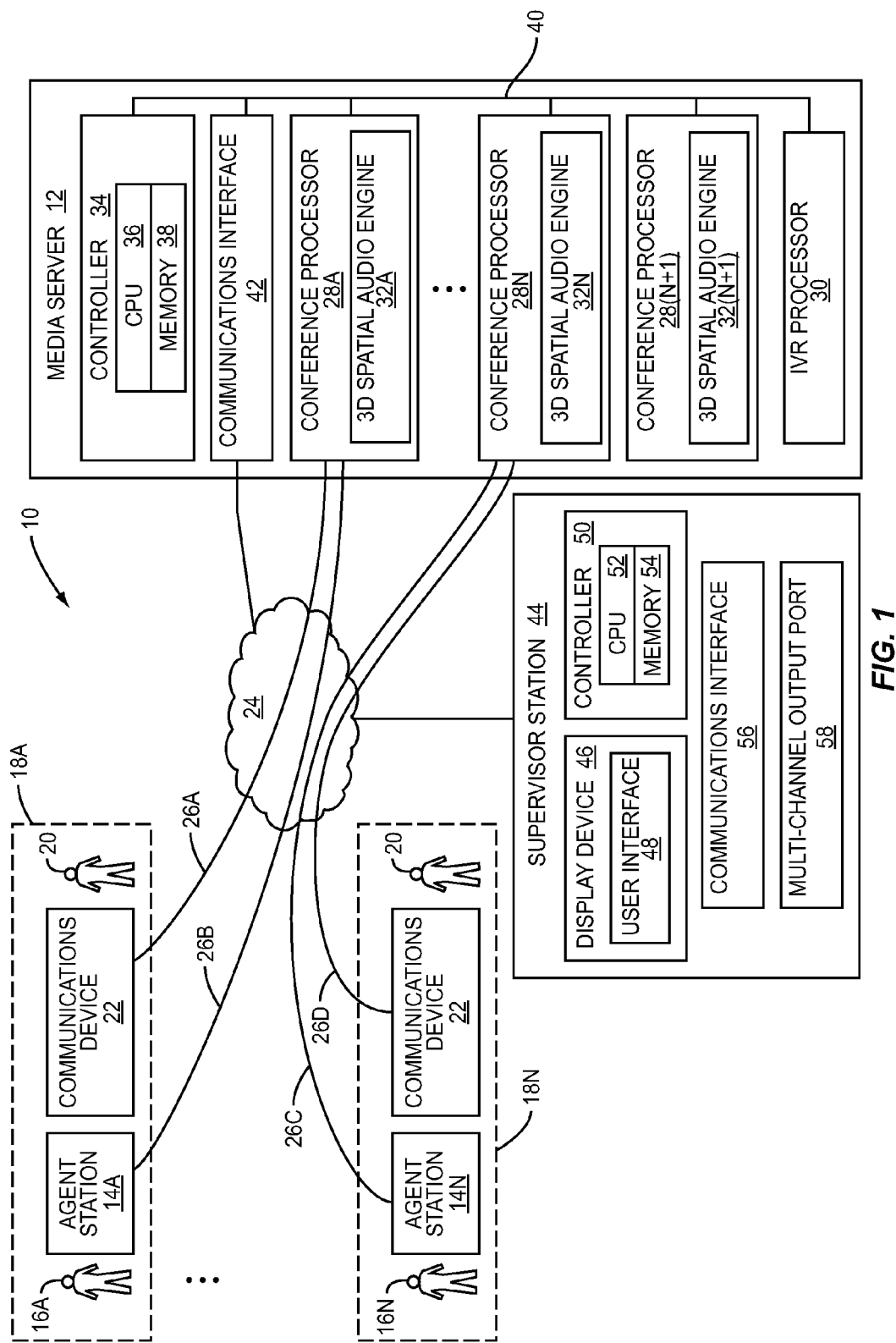
FIG. 1 is a block diagram illustrating an exemplary environment in which embodiments may be practiced.

Contact centers are used in a wide variety of applications, and in particular are frequently used to provide product support to purchasers of a company's products, although embodiments disclosed herein are not limited to any particular type of contact center. FIG. 1 is a block diagram illustrating an exemplary environment 10 in which embodiments may be practiced. The environment 10 includes one or more contact center media servers 12, hereinafter referred to as a media server 12, and a plurality of contact center agent stations 14A-14N (generally, agent station 14 or agent stations 14), each operated by a respective contact center agent 16A-16N (generally, agent 16 or agents 16). The agents 16 may be located in the same geographic location as one another or may be in different geographic locations.

A call handled by a contact center agent 16 will be referred to herein as a contact center transaction 18. Each individual participating in a contact center transaction 18, such as a respective caller 20 that initiates the contact center transaction 18, the contact center agent 16 that handles the contact center transaction 18, and any additional individuals who may be brought into the contact center transaction 18 by the contact center agent 16, will be referred to herein as a participant of the contact center transaction 18.

The caller 20 typically initiates the contact center transaction 18 by calling a designated telephone number of the contact center. The call is typically initiated via a communications device 22 and routed through one or more communication networks 24 to the media server 12 associated with the designated telephone number. Such networks 24 can comprise any network infrastructure, or combination of network infrastructures, suitable for establishing a communication session between a respective communications device 22 and the media server 12. For example, the network 24 may comprise a data communication network if the communications device 22 is a voice over Internet protocol (VOIP) communications device. The network 24 may comprise a cellular communication network if the communications device 22 comprises a cell phone. The network 24 may comprise a public switched telephone network (PSTN) if the communications device 22 comprises a telephone. While not illustrated in FIG. 1, such calls may go through multiple other devices associated with a particular type of network 24, such as switches, call servers, concentrators, gateways, or the like, as is known to those skilled in the art. Communications devices 22 may comprise any device capable of processing voice signals, including wired and wireless telephones, cellular telephones, PDAs, computers with audio processing capabilities, and the like.

The media server 12 operates to establish a bi-directional communication channel 26 between the communications device 22 that initiated the call and the media server 12. As the caller 20 speaks, the corresponding communications device 22 generates a media stream comprising voice signals of the caller 20 and communicates the media stream to the media server 12. Mechanisms for establishing the communication channel 26 may include, for example, Session Initiation Protocol (SIP), conventional PSTN voice paths, or any other suitable conventional or proprietary mechanism for establishing a communication channel. While a telephone number is used as an example by which a communications device 22 may connect to the media server 12, any suitable addressing mechanism may be used. For example, if SIP is used, the addressing mechanism may be an SIP address.

Voice signals may be analog or digital. The media stream may carry either monaural voice signals, as is likely in certain environments such as the PSTN, or may carry multi-channel voice signals where the media stream is generated via a multi-channel capable device, such as a computer.

In one embodiment, the media server 12 includes one or more conference processors 28A-28N (generally conference processor 28 or conference processors 28). The conference processors 28 may be implemented in software, hardware, or a combination thereof. The communication channels 26 corresponding to a particular contact center transaction 18 are anchored in a respective conference processor 28. For example, as illustrated in FIG. 1, the communication channels 26A, 26B associated with the contact center transaction 18A may be anchored by the conference processor 28A, and the communication channels 26C, 26D may be anchored by the conference processor 28N. The conference processor 28 enables the contact center agent 16 to relatively easily connect additional communication channels 26 to the contact center transaction 18 if desired. For example, the contact center agent 16 may determine that a problem raised by the caller 20 requires the help of a subject matter expert who has highly specialized skills and knowledge in a particular subject matter area. The conference processor 28 enables the contact center agent 16 to relatively easily establish a communication channel 26 between the media server 12 and a communications device 22 of the subject matter expert, who may seek additional information from the caller 20.

The media server 12 may also include an interactive voice recognition (IVR) processor 30 for automating the routing of an incoming call to a particular contact center agent 16. For example, upon receiving a new incoming call, the IVR processor 30 may be programmed to ask a series of questions of the caller 20 regarding a particular product or service for which the caller 20 seeks help, and based on the responses of the caller 20, automatically route the call to a particular contact center agent 16 who is identified as having appropriate knowledge of such products or services.

Each conference processor 28 may have a corresponding three-dimensional spatial audio engine (3DSAE) 32. The 3DSAE 32 receives incoming voice signals from the corresponding conference processor 28 along with audio attribute data corresponding to the incoming voice signals. The 3DSAE 32 modifies the voice signals in order to generate outgoing voice signals that include characteristics, such as phase and frequency information, that position the outgoing voice signals at an aural position indicated by the audio attribute data. The phrase "aural position" means that a listener listening to the outgoing voice signals via a multi-channel device such as a stereo headset will perceive the voice signals as originating from a location identified by the audio attribute data. For example, audio attribute data may indicate that an outgoing voice signal should appear to be originating from a location behind the listener. The 3DSAE 32, using the audio attribute data, modifies the voice signals to include characteristics such that when the listener hears the outgoing voice signals, the listener perceives the outgoing voice signals as originating from behind the listener. While for purposes of illustration each conference processor 28 is illustrated as including a respective 3DSAE 32, in other embodiments, the 3DSAE 32 may be a stand-alone process separate from the corresponding conference processor 28, or may be a separate communications device coupled to the media server 12.

The media server 12 includes a controller 34 which includes a central processing unit (CPU) 36 and memory 38, which is coupled via a communications bus 40 to each of the conference processors 28, the 3DSAEs 32, and the IVR processor 30, to control operations thereof. Each conference processor 28, each 3DSAE 32, and the IVR processor 30 may comprise a mixture of hardware, software, and firmware. While functionality associated with each of the conference processor 28, the 3DSAE 32, and the IVR processor 30 is shown separately for purposes of illustration, the functionality need not be implemented in separate circuitry or modules, and could be combined as desired or appropriate into more or fewer modules. A communications interface 42 may handle the establishment of the communication channels 26 with corresponding conference processors 28, and enable data communications via the network 24 with agent stations 14 or a supervisor station 44.

The exemplary environment 10 includes the supervisor station 44 used by a supervisor to monitor the agents 16. The supervisor station 44 may comprise, for example, a computing device, such as a personal computer, that is capable of establishing a communication channel 26 with the media server 12 via the network 24, and capable of data communications with the media server 12. The supervisor station 44 includes a display device 46 upon which one or more user interfaces 48 may be displayed to the supervisor. A controller 50 may include a CPU 52 and memory 54 for controlling the overall operation of the supervisor station 44.

The supervisor station 44 may also include a communications interface 56 for facilitating a communication channel 26 and/or a data communication channel with the media server 12 to enable exchange of data between the supervisor station 44 and the media server 12, as described in greater detail herein. A multi-channel output port 58 provides multi-channel audio signals to an output device, such as a stereo headset or a multi-channel speaker arrangement, to enable the supervisor to listen to one or more contact center transactions 18, as desired. As discussed in greater detail herein, the spatial orientation of the monitored agents 16 will be generated into the output port 58 from the media server 12 in such a way as to orient the audio signals of each corresponding agent 16 at discernable angles in the sound field of the supervisor's output device, enabling recognition of the different agent audio streams in the sound field. The orientation can be based on the interface representations shown below.

All or portions of the embodiments disclosed herein may be implemented as a computer program product, such as a computer-usable medium having a computer-readable program code embodied therein. The computer-readable program code can include software instructions for implementing the functionality of embodiments described herein.

While not illustrated in detail in FIG. 1, the agent stations 14 may comprise computing devices that are similar or identical to the supervisor station 44. In particular, the agent stations 14 may enable a corresponding agent 16 to send and receive voice signals to the media server 12 via a communication channel 26, and preferably include an ability to exchange data with the media server 12 for controlling aspects of the contact center transaction 18, such as joining subject matter experts and the like, as desired.

According to one embodiment, the supervisor manipulates the user interface 48 to facilitate the monitoring of one or more contact center transactions 18. For example, and as described in greater detail herein with respect to FIGS. 2-10, the supervisor may use an input device, such as a mouse, to manipulate the user interface 48 and thereby affect the aural position of voice signals of multiple agents 16 such that the voice signals of each agent 16 are perceived by the supervisor as originating from a different position. This allows the supervisor to easily monitor multiple agents 16 concurrently, and easily distinguish which of the multiple agents 16 may require help from the supervisor. In essence, from an audio perspective, embodiments simulate a supervisor physically strolling about an office in which multiple agents 16 are handling contact center transactions 18, even though in reality each agent 16 and the supervisor may be in different geographic locations.

As discussed above, 3D spatializer technology provided by the 3DSAE 32 modifies voice signals to generate outgoing voice signals that contain audio characteristics, such as frequency and phase differences, that aurally position the voice signals at a desired position based on the audio attribute data provided by the supervisor station 44. The incoming voice signals may be monaural or multi-channel. The outgoing voice signals are multi-channel voice signals, such as stereo or Dolby Digital 5.1 voice signals. For example, and as discussed in greater detail below, the supervisor may aurally position the voice signals of one agent 16 on the left side of the supervisor, voice signals of another agent 16 to the front of the supervisor, and voice signals of a third agent 16 to the right of the supervisor.

In order to accomplish this, in one embodiment the 3DSAE 32 receives incoming voice signals associated with multiple agents 16, and based on the audio attribute data associated with each of the incoming voice signals, generates multi-channel outgoing voice signals that include the audio characteristics necessary to position the outgoing voice signals at the designated aural positions. The 3DSAE 32 then mixes the outgoing voice signals to create a combined outgoing voice signal, which may then be provided to the supervisor station 44. For example, assume that a supervisor desires to monitor three agents 16. The 3DSAE 32 may receive voice signals for each of the three agents 16. The 3DSAE 32 generates multi-channel outgoing voice signals for each of the three agents 16 at designated aural positions based on corresponding audio attribute data, and mixes the three multi-channel outgoing voice signals into a single multi-channel outgoing voice signal that is provided, via the conference processor 28, to the supervisor station 44.

Spatializer technology is available from various entities, including Avaya Inc., 211 Mt. Airy Road, Basking Ridge, N.J. 07920. Studies have established that a human's capacity to assimilate multiple conversations, and identify a particular speaker from a plurality of potential speakers, increases significantly when the voice signals are at different aural positions. In order for the supervisor to receive multi-channel voice signals, the supervisor utilizes a multi-channel capable device, such as a headset, or multiple speakers, to listen to the contact center transactions 18.

Figure 2:
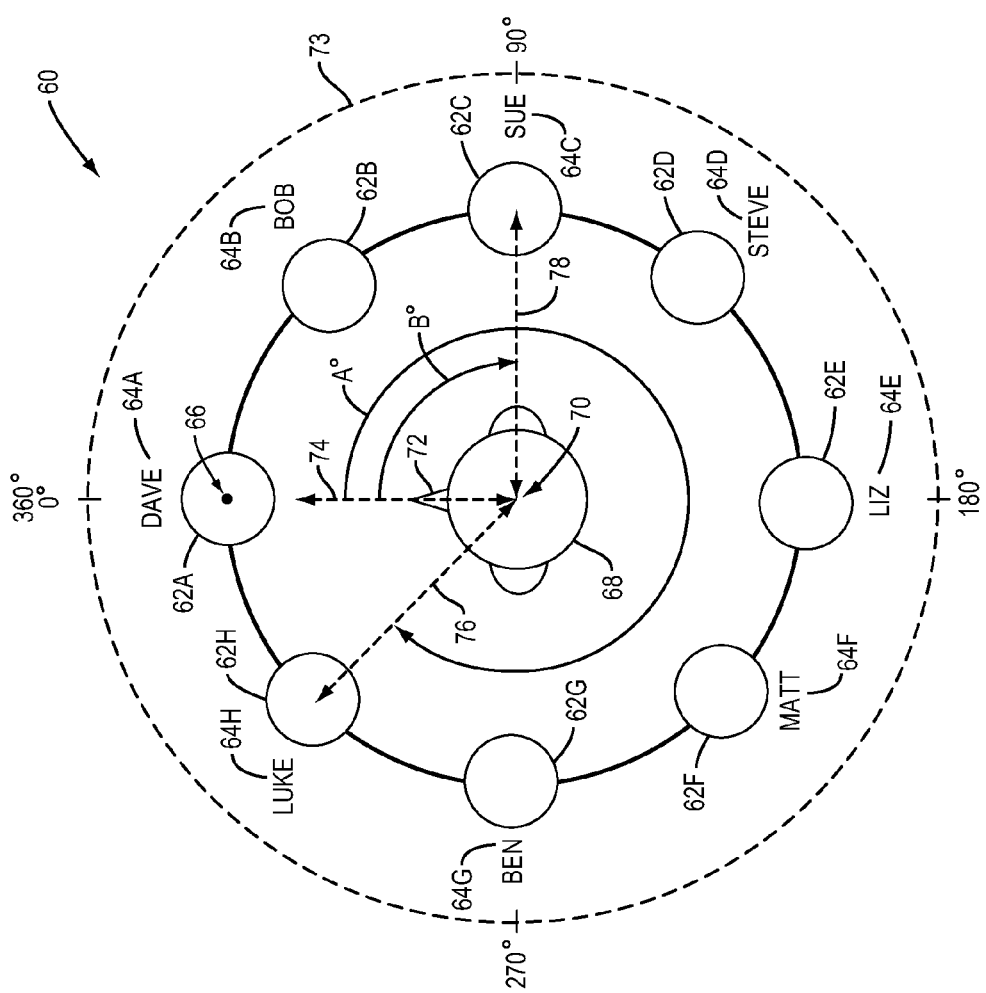
FIG. 2 illustrates an exemplary user interface which may be used by a supervisor to concurrently monitor multiple agents.

FIG. 2 illustrates an exemplary user interface 60 which may be used by a supervisor to concurrently monitor multiple agents 16. It should be understood that the user interface includes display elements, as illustrated in FIG. 2, as well as related processing modules that execute on the supervisor station 44 to implement the functionality described herein. The user interface 60 includes a plurality of agent identifiers 62A-62H (generally, agent identifier 62 or agent identifiers 62). Each agent identifier 62 represents, or corresponds to, an agent 16. Thus, in the example illustrated in FIG. 2, the supervisor is monitoring eight agents 16. For purposes of illustration, the agent identifiers 62 are depicted merely as circles, but each agent identifier 62 may include a graphic image, such as a small photograph of the corresponding agent 16, or may comprise any other suitable icon, shape, or indicium that may be used by the supervisor to visually correspond the agent identifier 62 to a particular agent 16. An agent identifier 62 may also comprise a name label 64 identifying the corresponding agent 16.

Each of the agent identifiers 62 has a corresponding agent identifier location that is determinable by the user interface 60. The agent identifier location may be quantified in any desired or suitable manner for the particular user interface 60. For example, if the user interface 60 comprises an array of individually addressable pixels, a location may be quantified by an x,y coordinate that identifies a particular pixel in the array. It will be apparent that other suitable reference systems could be used by the user interface 60 to identify a location of an agent identifier 62. For purposes of illustration, it will be assumed that the agent identifier location of a corresponding agent identifier 62 is based on the location of the center of the respective agent identifier 62, as denoted in FIG. 2 by center point 66 for the agent identifier 62A.

The user interface 60 also includes a supervisor reference position. The supervisor reference position is quantified in terms of a supervisor reference location (SRL) and a supervisor reference direction (SRD). As discussed with regard to the agent identifiers 62, the supervisor reference location may be determined based on any suitable reference system, and may be depicted visually by a supervisor identifier 68. For purposes of illustration, it will be assumed that the SRL of the supervisor identifier 68 is based on the location of the center of the supervisor identifier 68, as denoted by center point 70. The SRD may comprise any suitable mechanism for describing a direction. In one embodiment, the SRD may be identified as a particular direction with respect to a 360° circle 73 (while the 360° circle 73 is depicted for purposes of illustration, it may or may not be depicted to the supervisor in practice). The SRD may be indicated visually by a visible feature 72 of the supervisor identifier 68. Thus, an SRD 74 may be described in terms of the 360 degree circle 73, and denoted visually by the visible feature 72. The SRD 74 may also correspond, in aural positioning terms, to a location directly in front of the supervisor.

The user interface 60 determines audio attribute data for each of the agent identifiers 62. The audio attribute data includes audio direction data and audio distance data. Audio direction data is determined based on the location of an agent identifier 62 with respect to the SRD 74. Audio distance data is based on the location of the agent identifier 62 with respect to the SRL. For example, audio attribute data corresponding to the agent identifier 62A includes audio direction data that describes the direction of the agent identifier 62A with respect to the SRD 74. The audio direction data may be quantified in terms of an angle between the SRD 74 and a line originating from the center point 70 and intersecting the agent identifier 62A. Since the agent identifier 62A is directly in front of the supervisor identifier 68, i.e., the SRD 74 points directly to the agent identifier 62A, the angle between the SRD 74 and a line originating from the center point 70 and intersecting the agent identifier 62A is 0°. The audio distance data may be determined based on a distance between the agent identifier location, as denoted by the center point 66, and the SRL, as denoted by the center point 70. Assume such distance is 100 pixels. Thus, the audio attribute data corresponding to the agent identifier 62A may comprise (0°,100).

As another example, the audio attribute data for the agent identifier 62H may comprise (A°, 100), wherein A° is the angle between the SRD 74 and a line 76 that originates from the center point 70 and intersects the agent identifier 62H, and 100 represents a distance in pixels between the location of the agent identifier 62H and the SRL. Audio attribute data corresponding to the agent identifier 62C may comprise (B°, 100), wherein B° is the angle between the SRD 74 and a line 78 that originates from the center point 70 and intersects the agent identifier 62C, and 100 represents a distance in pixels between the location of the agent identifier 62C and the SRL. Although not illustrated, the user interface 60 determines audio attribute data for each of the other agent identifiers 62B, 62D-62G in a similar manner.

Figure 3:
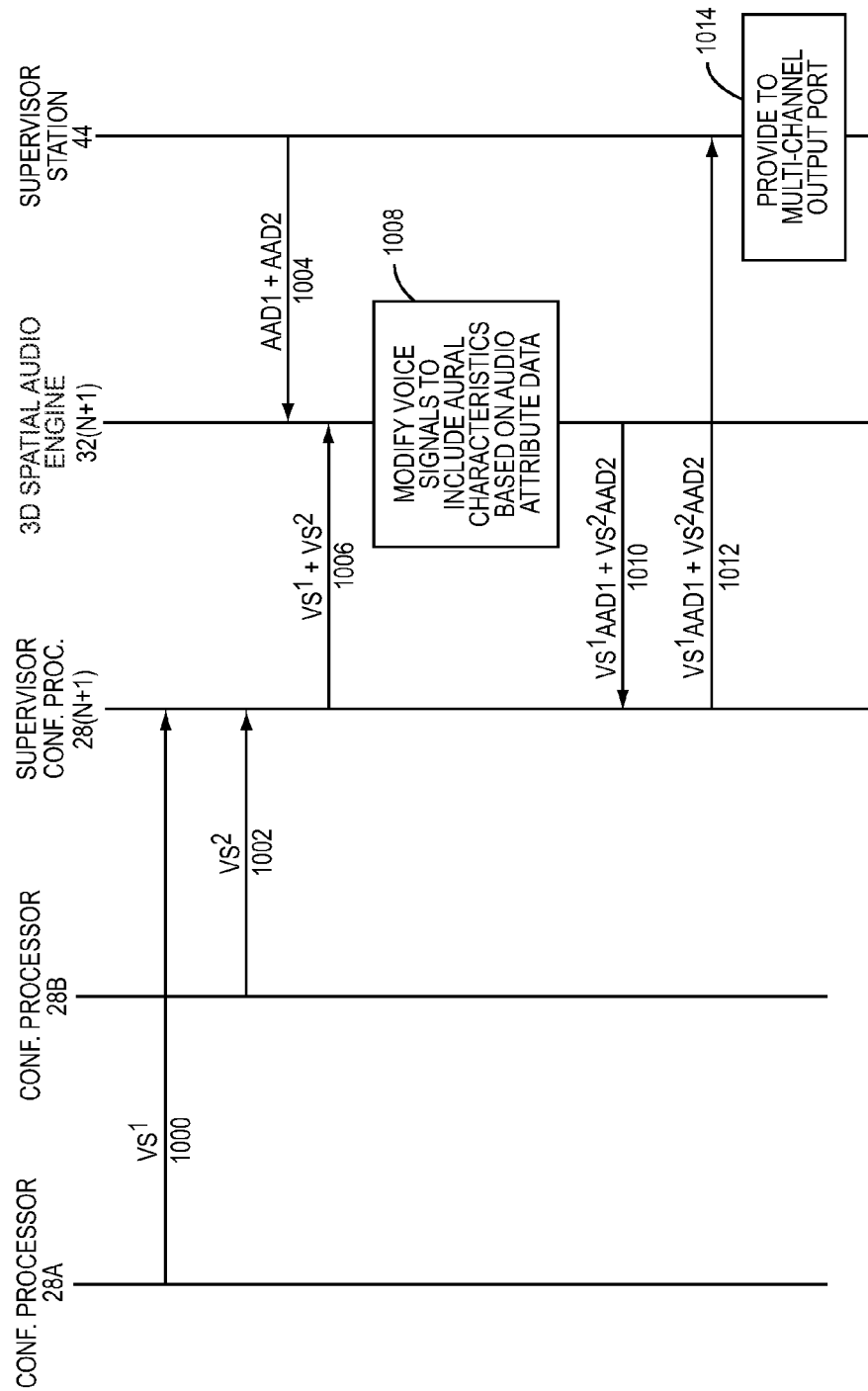
FIG. 3 is a message flow diagram illustrating an exemplary message flow for enabling a supervisor to concurrently monitor multiple contact center agents.

FIG. 3 is a message flow diagram illustrating an exemplary message flow for enabling a supervisor to concurrently monitor multiple contact center agents. FIG. 3 will be discussed in conjunction with FIGS. 1 and 2. Assume that upon initiating the user interface 60, the supervisor station 44 establishes a communication channel 26 with the media server 12, which is anchored by the conference processor 28(N+1). Either automatically, or upon direction from the supervisor station 44, the controller 34 determines the number of agents 16 that are handling contact center transactions 18. For each such agent 16, the media server 12 may provide data to the supervisor station 44 such as a name label 64, an agent identifier 62, or the like. The data may also include a unique identifier for each agent 16 that can be used by the supervisor station 44 to associate audio attribute data with a particular agent 16. The user interface 60 uses the name labels 64 and agent identifiers 62 to populate the user interface 60. In an alternate embodiment, the name labels 64 and agent identifiers 62 may be stored in the supervisor station 44, and the media server may merely provide the supervisor station 44 a unique identifier identifying a particular agent 16. The supervisor station 44 uses the unique identifier to locate the appropriate name label 64 and agent identifier 62 corresponding to the unique identifier.

Assume for purposes of illustration that eight such agents 16 are handling contact center transactions 18, and each such agent 16 corresponds to a particular agent identifier 62. The agent 16 that corresponds to a particular agent identifier 62 will be discussed herein by using the same alphabetic character in both reference numbers. For example, the agent 16A corresponds to the agent identifier 62A and an agent 16E corresponds to the agent identifier 62E. The controller 34 also directs the respective conference processors 28A and 28B to provide voice signals from the corresponding agents 16A-16H to the conference processor 28(N+1). For brevity, FIG. 3 only depicts message flow associated with two agents, 16A and 16B, but it should be apparent that similar message flow would occur for each such agent 16, irrespective of the number of agents 16. The conference processors 28A, 28B provide corresponding voice signals of respective agents 16A, 16B to the conference processor 28(N+1) (FIG. 3, steps 1000, 1002). As the user interface 60 is populated with the agent identifiers 62, the user interface 60 determines audio attribute data associated with each agent identifier 62. The supervisor station 44 provides the audio attribute information to the 3DSAE 32(N+1) (either directly or via the conference processor 28(N+1)) (FIG. 3, step 1004). The conference processor 28(N+1) provides the voice signals of the agents 16 to the 3DSAE 32(N+1) (FIG. 3, step 1006). The 3DSAE 32(N+1), based on the audio attribute data, modifies the voice signals of the corresponding agents 16 to aurally position the voice signals at the appropriate locations identified by the audio direction data (FIG. 3, step 1008). The 3DSAE 32(N+1) may also modify the voice signals to have a volume relative to one another based on the audio distance data. The 3DSAE 32(N+1) combines the modified voice signals and provides the combined voice signals to the conference processor 28(N+1) (FIG. 3, step 1010). The conference processor 28(N+1) provides the combined voice signals to the supervisor station 44 (FIG. 3, step 1012). The supervisor station 44 provides the combined voice signals to the multi-channel output port 58 for playback to the supervisor on a multi-channel output device, such as a stereo headset.

The supervisor perceives the voices of the agents 16 in accordance with the position of the corresponding agent identifiers 62 in the user interface 60. For example, the supervisor perceives the voice signals of the agent 16A as originating directly in front of the supervisor, the voice signals of the agent 16C as originating directly to the right of the supervisor, the voice signals of the agent 16E as originating directly behind the supervisor, and the voice signals of the agent 16G as originating directly to the left of the supervisor. Because the audio distance data for each of the agent identifiers 62A-62H is the same, the relative volume of each of the corresponding agents 16A-16H is the same.

Figure 4:
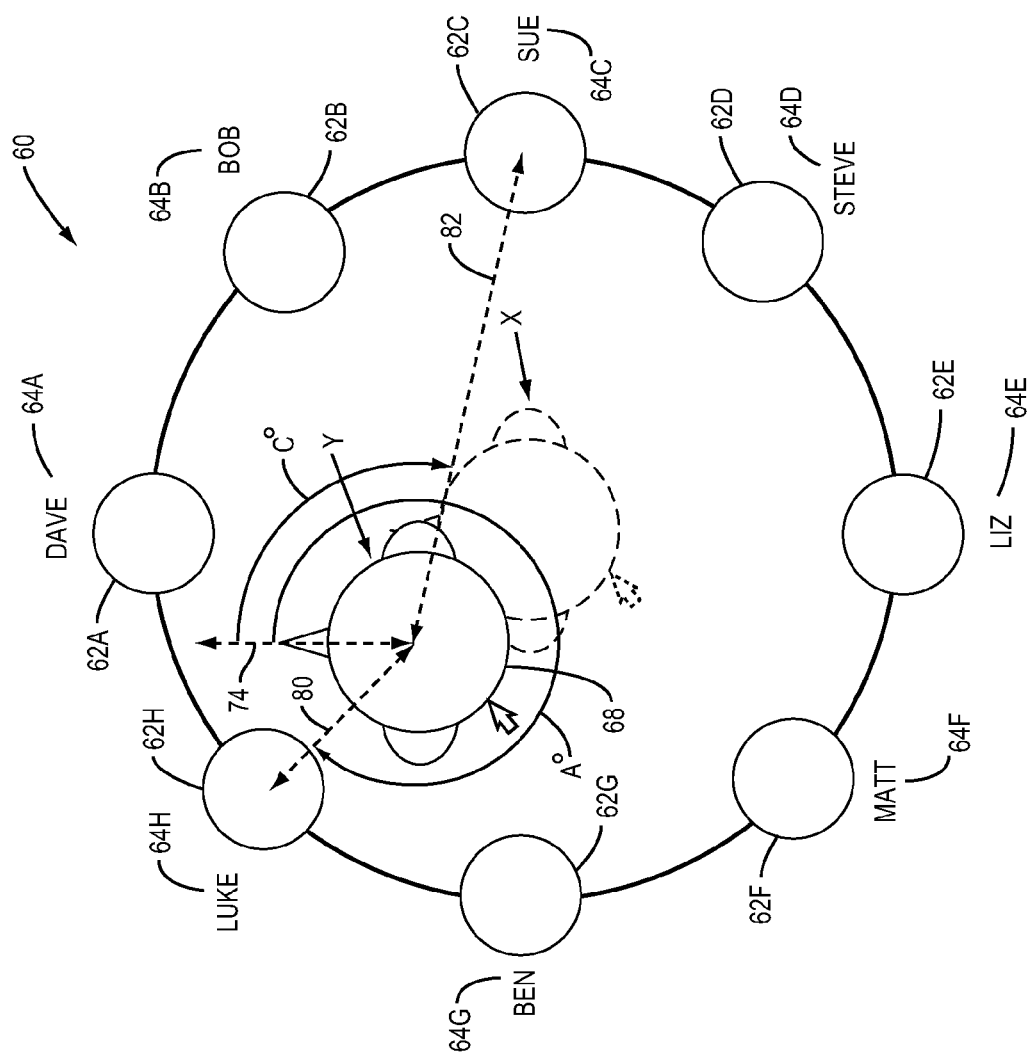
FIG. 4 illustrates the exemplary user interface illustrated in FIG. 2 after the supervisor has manipulated the user interface to alter the audio attribute data for at least one agent identifier.
Figure 5:
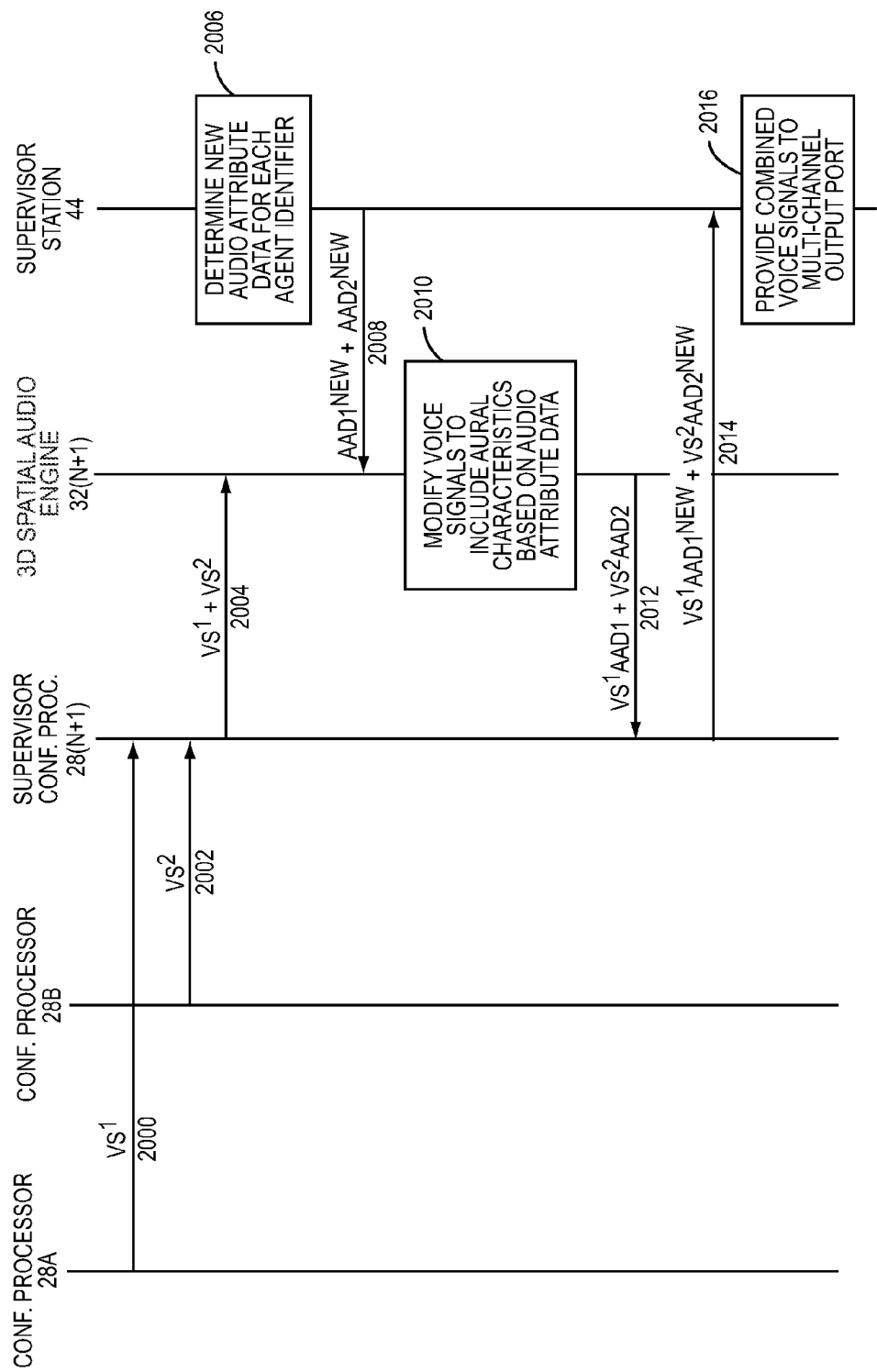
FIG. 5 is a message flow diagram illustrating an exemplary message flow that may occur upon manipulation of the user interface by the supervisor.

FIG. 4 illustrates the exemplary user interface 60 illustrated in FIG. 2 after the supervisor has manipulated the user interface 60 to alter the audio attribute data for at least one agent identifier 62. FIG. 5 is a message flow diagram illustrating an exemplary message flow that may occur upon manipulation of the user interface 60 by the supervisor. FIGS. 4 and 5 will be discussed in conjunction with one another. Referring first to FIG. 4, the supervisor has manipulated the user interface 60 to move the supervisor identifier 68 from location X to location Y. While FIG. 4 illustrates that the supervisor identifier 68 was "dragged" from location X to location Y via an input device, such as a mouse, in other embodiments the location of the supervisor identifier 68 may be fixed, and the user interface elements other than the supervisor identifier 68 may be "dragged" with respect to the supervisor identifier 68, rather than vice versa.

Prior to the movement of the supervisor identifier 68, assume, as before, that the voice signals of the agents 16A-16H are being provided from respective conference processors 28A-28H to the conference processor 28(N+1) (FIG. 5, steps 2000, 2002, illustrating the voice signals of only two of the eight agent 16s). The conference processor 28(N+1) provides the voice signals to the 3DSAE(N+1) (FIG. 5, step 2004). After the supervisor drags the supervisor identifier 68 from location X to location Y, the user interface 60 determines new audio attribute data for each of the agent identifiers 62A-62H (FIG. 5, step 2006). In particular, the determination may, for example, be triggered by the "release" of a mouse button after the supervisor identifier 68 has been moved in the user interface 60. Note that with respect to this particular movement, the audio direction data of the agent identifier 62H remains the same, in particular the angle A°. However, the audio direction data of the agent identifiers 62A-62G each change to some extent. Note also that the audio distance data is now different for each of the agent identifiers 62A-62H because the distance between the respective agent identifier location and the SRL has changed. For example, the distance associated with line 80, which reflects the distance between the location of the agent identifier 62H and the SRL, may now be 50 pixels. Similarly, the distance associated with line 82, which reflects the distance between the location of the agent identifier 62C and the SRL, may now be 118 pixels.

The supervisor station 44 provides the newly determined audio attribute data for each of the agent identifiers to the 3DSAE 32(N+1) (FIG. 5, step 2008). The 3DSAE 32(N+1) modifies the voice signals of the corresponding agents 16 to aurally position the voice signals at the appropriate locations identified by the new audio direction data (FIG. 5, step 2010). The 3DSAE 32(N+1) also modifies the voice signals to have a volume relative to one another based on the audio distance data. Thus, the voice signals of the agent 16H will be louder than, for example, the voice signals of the agents 16B-16F. Such altering of volume may or may not be linear. Thus, in one embodiment, the volume associated with the voice signals of the agent 16H may be twice (assume for purposes of illustration 3 dB) as loud if the supervisor identifier 68 is at location Y than if the supervisor identifier 68 is at location X. Similarly, the volume of the voice signals of the agent 16C may be reduced by ¾ (6 dB). Thus, by moving the supervisor identifier 68 closer to the agent identifier 62H, the supervisor increases his perception of the agent 16H through volume.

The 3DSAE 32(N+1) combines the modified voice signals and provides the combined voice signals to the conference processor 28(N+1) (FIG. 5, step 2012). The conference processor 28(N+1) provides the combined voice signals to the supervisor station 44 (FIG. 5, step 2014). The supervisor station 44 provides the combined voice signals to the multi-channel output port 58 for playback to the supervisor on a multi-channel output device, such as a stereo headset (FIG. 5, step 2016).

Figure 6:
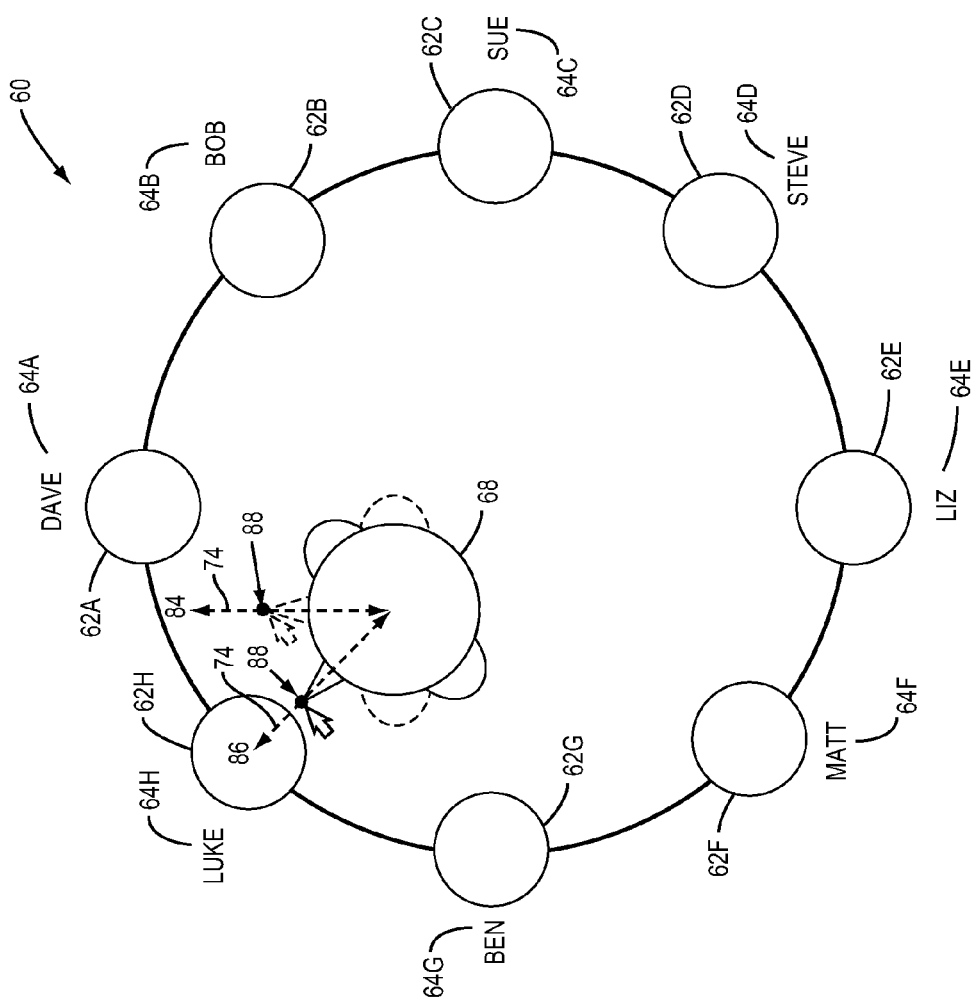
FIG. 6 illustrates the exemplary user interface illustrated in FIGS. 2 and 4 after the supervisor has further manipulated the user interface to alter the audio attribute data for one or more agent identifiers.

FIG. 6 illustrates the exemplary user interface 60 illustrated in FIGS. 2 and 4 after the supervisor has further manipulated the user interface 60 to alter the audio attribute data for one or more agent identifiers 62. In particular, the supervisor has manipulated the supervisor identifier 68 from a first direction 84 to a second direction 86. This may be facilitated, for example, by selection of a rotation node 88 of the supervisor identifier 68, which enables the supervisor to easily and intuitively rotate the supervisor identifier 68 to alter the SRD 74 of the supervisor identifier 68 without altering the SRL of the supervisor identifier 68. After the supervisor releases the mouse button, the user interface 60 determines new audio attribute data for each of the agents 16A-

16H and provides the new audio attribute data to the 3DSAE 32(N+1). The audio distance data for each of the agent identifiers 62A-62H remains the same, and thus the relative volume of the voice signals for each agent 16 remains unchanged. However, the audio direction data is altered such that the voice signals provided to the supervisor would now sound to the supervisor the same as if the supervisor had turned his head slightly to the left to look directly at the agent 16H.

Figure 7:
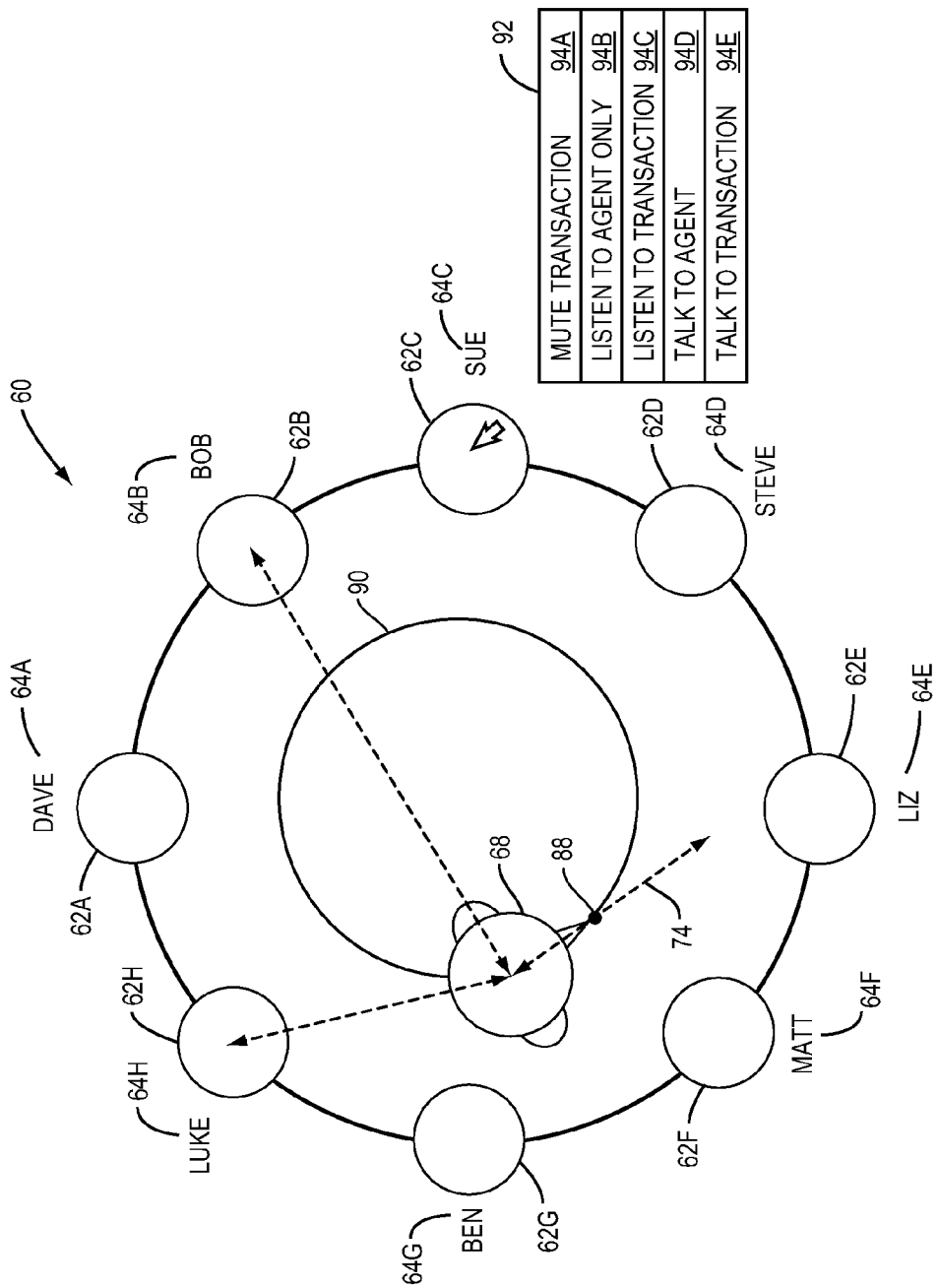
FIG. 7 illustrates another exemplary user interface for facilitating a supervisor's monitoring of agents.

FIG. 7 illustrates another exemplary user interface 60 for facilitating a supervisor's monitoring of the agents 16A-16H. In this embodiment, the user interface 60 includes a circular track 90 in which the supervisor identifier 68 may be easily manipulated by the supervisor to simulate a supervisor actually walking around a physical office in which the agents 16 are handling contact center transactions 18. The user interface 60 may "slot" the supervisor identifier 68 in the circular track 90 such that the supervisor identifier 68 remains in the circular track 90 even though the supervisor's manipulation of the input device deviates from a circular motion. This behavior may be rigid, or alterable by the supervisor. The user interface 60 may continually, as the supervisor identifier 68 is moved about the circular track 90, alter the SRD 74 such that the SRD 74 remains, for example, tangential to the circular track 90, to simulate the manner in which a human supervisor may actually walk around a circular arrangement of agents 16. As described previously, the user interface 60 continuously determines new audio attribute data for each of the agent identifiers 62A-62H and provides the data to the 3DSAE 32(N+1), so that the voice signals of the agents 16 provided to the supervisor change in accordance with movement of the supervisor identifier 68 about the circular track 90. The supervisor may manipulate the rotation node 88 to alter the SRD 74.

Assume that the supervisor selects the agent identifier 62C, by, for example, right-clicking a mouse button when a cursor is positioned over the agent identifier 62C. Upon detecting the selection, the user interface provides a menu selection box 92. The menu selection box 92 identifies a plurality of menu items 94A-94E. Selection of one or more of the menu items 94A-94E results in messages, in the form of control signals, generated by the supervisor station 44 and sent to the media server 12 in order to alter behavior of one or more of the conference processors 28. For example, selection of the menu item 94A (i.e., "MUTE TRANSACTION") may result in a control signal to the conference processor 28(N+1) to discontinue sending the voice signals of the agent 16C to the supervisor station 44. Selection of the menu item 94B (i.e, "LISTEN TO AGENT ONLY") may result in a control signal to the conference processor 28C to provide only the voice signals of the agent 16C, and not the voice signals of any other participants of the contact center transaction 18 being handled by the agent 16C, to the conference processor 28(N+1). Thus, selection of the menu item 94B allows the supervisor to hear only the voice of the agent 16C, but not those of the caller or other participants.

Selection of the menu item 94C (i.e, "LISTEN TO TRANSACTION") may result in a control signal to the conference processor 28C to provide the voice signals of the agent 16C and those of each of the other participants in the contact center transaction 18 to the conference processor 28(N+1). In this manner, the supervisor may listen in on the complete contact center transaction 18. Selection of the menu item 94D (i.e, "TALK TO AGENT") may result in a control signal to the conference processors 28C and 28(N+1) to enable the supervisor to talk with the agent 16C, such that the voice signals of the supervisor are not provided to the other participants of the contact center transaction 18 being handled by the agent 16C. This may sometimes be referred to as a "whisper" mode in which an agent and supervisor may surreptitiously conduct a conversation during a contact center transaction 18. Selection of the menu item 94E (i.e., "TALK TO TRANSACTION") may result in a control signal to the conference processors 28C and 28(N+1) to enable the supervisor to talk with all of the participants in the contact center transaction 18 being handled by the agent 16C. While functioning in one or more of these modes, voice signals associated with the agents 16A, 16B, and 16D-16H may be muted, as appropriate.

FIGS. 8A and 8B illustrate exemplary changes in relative volume of agents 16 based on different audio distance data associated with agent identifiers 62. In FIG. 8A, the audio distance data between each of the agent identifiers 62 and the SRL is the same. Graph 96 indicates that the volume of the voice signals of each of the agents 16 are thus the same. In FIG. 8B, the audio distance data between the agent identifiers 62 and the SRL differ. In particular, the supervisor identifier 68 is closer to the agent identifiers 62D and 62E (Steve and Liz, respectively), than to the other agent identifiers 62. Thus, graph 98 indicates that the relative volume of the voice signals of the agents 16D and 16E are louder than those of the other agents 16.

Figure 9A:
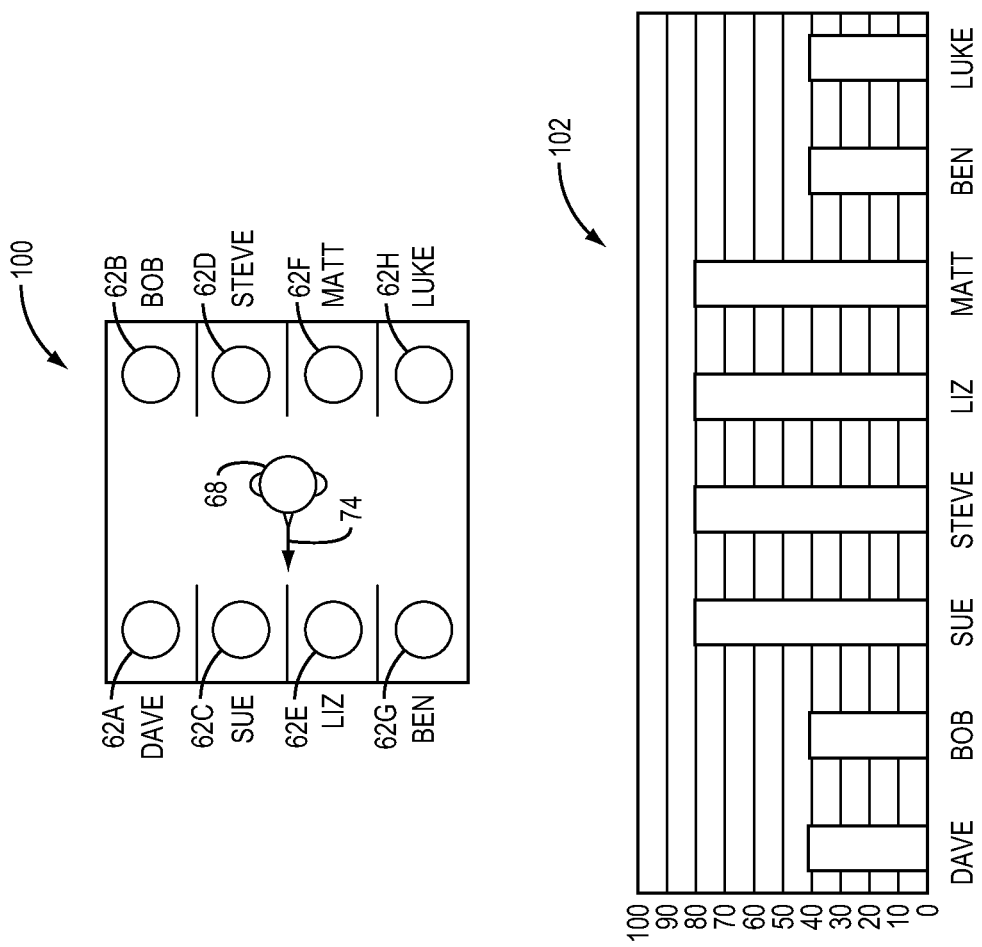

FIGS. 9A-9C illustrate another exemplary user interface 100 for facilitating the monitoring of agents 16 by the supervisor. The user interface 100 positions the agent identifiers 62 in a rectangular cubicle pattern rather than a circle, however, determination of the audio attribute information for each of the agent identifiers 62 may be similar or identical to that described above with regard to FIG. 2. Thus, the SRD 74 is slightly between agent identifiers 62C and 62E (Sue and Liz, respectively). The voice signals of the corresponding agents 16B, 16D, 16F, and 16H would be perceived by the supervisor as originating behind the supervisor, at respective different locations. The voice signals of the corresponding agents 16A, 16C, 16E, and 16G would be perceived by the supervisor as originating in front of the supervisor, at respective different locations. A graph 102 indicates that the volume of the agents 16C-16F are at the same relative level, because the distances between the agent identifiers 62C-62F and the supervisor identifier 68 are the same. The volume of the voice signals of the agents 16A, 16B, 16G, and 16H are also the same, but lower than the volume of the voice signals of the agents 16C-16F.

FIG. 9B illustrates the user interface 100 after the supervisor has manipulated the supervisor identifier 68. A graph 104 illustrates how the movement of the supervisor identifier 68 may alter the relative volume of the voice signals of the agents 16A-16H.

FIG. 9C illustrates the user interface 100 after the supervisor has manipulated the supervisor identifier 68 by placing the supervisor identifier 68 on top of the agent identifier 62E. Superimposing the supervisor identifier 68 on top of an agent identifier 62 may signal to the user interface 100 a special circumstance where the voice signals of all other agents are muted, as illustrated in graph 106.

Figure 10:
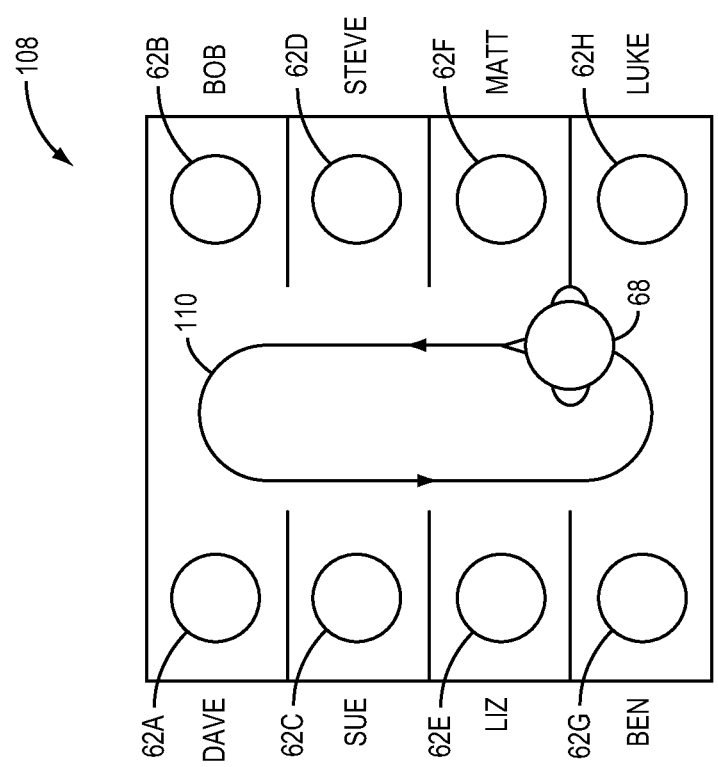
FIG. 10 illustrates another exemplary user interface for facilitating a supervisor's monitoring of agents.

FIG. 10 illustrates another exemplary user interface 108 for facilitating a supervisor's monitoring of the agents 16A-16H. In this embodiment, the user interface 108 includes an oval track 110 on which the supervisor identifier 68 may be easily manipulated by the supervisor to simulate a supervisor walking around a physical cubicle arrangement that approximates that illustrated in FIG. 10. The user interface 108 may "slot" the supervisor identifier 68 in the oval track 110 such that the supervisor identifier 68 remains in the oval track 110 even though the supervisor's manipulation of the input device deviates from an oval motion. This behavior may be rigid, or alterable by the supervisor. The user interface 108 may continually, as the supervisor identifier 68 is moved about the oval track 110, alter the SRD 74 such that the SRD 74 remains, for example, in the direction of movement of the supervisor identifier 68 about the oval track 110, to simulate the manner in which a human supervisor may walk around such an arrangement of agents 16. The user interface 108 continuously determines new audio attribute data for each of the agent identifiers 62A-62H and provides the data to the 3DSAE 32(N+1), as described previously, so that the voice signals of the agents 16 provided to the supervisor change in accordance with movement of the supervisor identifier 68 about the oval track 110.

In one embodiment, a supervisor may be able to alter the voice signals of a selected agent 16 in other ways. For example, the user interface 108 (and the user interfaces discussed previously herein) may, in response to a selection by the supervisor, allow the supervisor to "colorize" the voice signals of an agent 16. Assume that in response to a supervisor's selection of a particular menu item, the user interface 108 displays a submenu that includes a list of colorization options. Such options may include "soprano," "baritone," "tenor," "male," "female," and the like. Upon selection of one of the colorization options, the user interface 108 provides colorization data corresponding to the selected colorization option to the conference processor 28(N+1). Thereafter, the conference processor 28(N+1) (or 3DSAE 32(N+1)) can modify the voice signals of the agent 16 corresponding to the selected agent identifier 62 to include audio characteristics associated with the selected colorization option. For example, if the supervisor selects a "soprano" colorization option, the voice signals may be modified to be at a higher frequency. The ability to colorize the voice signals of an agent 16 enables a supervisor to further distinguish the voice signals of particular agents 16 from a group of agents 16.

Those skilled in the art will recognize improvements and modifications to the preferred embodiments of the present disclosure. All such improvements and modifications are considered within the scope of the concepts disclosed herein and the claims that follow.

What is claimed is:

1. A computer-implemented method for controlling audio streams, comprising:
    providing, by a computing device comprising a processor, a user interface on a display device, the user interface comprising a plurality of agent identifiers, including a first agent identifier and a second agent identifier, and a user-movable supervisor identifier having a supervisor reference position comprising a supervisor reference location and a supervisor reference direction;
    providing to a three-dimensional spatial audio engine (3DSAE) first audio attribute data identifying a location of the first agent identifier in the user interface with respect to the supervisor reference position of the supervisor identifier, the first audio attribute data comprising first audio direction data based on the location of the first agent identifier with respect to the supervisor reference direction and first audio distance data based on the location of the first agent identifier with respect to the supervisor reference location;
    providing to the 3DSAE second audio attribute data identifying a location of the second agent identifier in the user interface with respect to the supervisor reference position, the second audio attribute data comprising second audio direction data and second audio distance data;
    receiving first voice signals corresponding to the first agent identifier, wherein the first voice signals include first aural characteristics based on the first audio attribute data, the first aural characteristics aurally positioning the first voice signals based on the first audio direction data and amplifying the first voice signals based on the first audio distance data;
    receiving second voice signals corresponding to the second agent identifier, wherein the second voice signals include second aural characteristics based on the second audio attribute data, the second aural characteristics aurally positioning the second voice signals based on the second audio direction data and amplifying the second voice signals based on the second audio distance data;
    concurrently presenting the first voice signals and the second voice signals to the output port; and
    responsive to the supervisor identifier being moved to a new location in the user interface:
        determining third audio attribute data based on a change in the location of the first agent identifier with respect to the supervisor reference position, the third audio attribute data comprising third audio direction data and third audio distance data:
        providing to the 3DSAE the third audio attribute data;
        receiving the first voice signals corresponding to the first agent identifier, wherein the first voice signals include third aural characteristics based on the third audio attribute data, the third aural characteristics aurally positioning the first voice signals based on the third audio direction data and amplifying the third voice signals based on the third audio distance data; and
        presenting the first voice signals to the output port.

2. The computer-implemented method of claim 1, wherein the first audio direction data is different from the second audio direction data.

3. The computer-implemented method of claim 1, wherein the first audio distance data is different from the second audio distance data.

4. The computer-implemented method of claim 1, wherein the first audio attribute data is different from the second audio attribute data.

5. A supervisor station comprising:
    a display device;
    a communications interface adapted to interface with a network; and
    a controller coupled to the communications interface and configured to:
        provide a user interface on the display device, the user interface comprising a plurality of agent identifiers, including a first agent identifier and a second agent identifier, and a user-movable supervisor identifier having a supervisor reference position comprising a supervisor reference location and a supervisor reference direction;
        provide to a three-dimensional spatial audio engine (3DSAE) first audio attribute data identifying a location of the first agent identifier in the user interface with respect to the supervisor reference position of the supervisor identifier, the first audio attribute data comprising first audio direction data based on the location of the first agent identifier with respect to the supervisor reference direction and first audio distance data based on the location of the first agent identifier with respect to the supervisor reference location;
        provide to the 3DSAE second audio attribute data identifying a location of the second agent identifier in the user interface with respect to the supervisor reference position, the second audio attribute data comprising second audio direction data and second audio distance data;

receive first voice signals corresponding to the first agent identifier, wherein the first voice signals include first aural characteristics based on the first audio attribute data, the first aural characteristics aurally positioning the first voice signals based on the first audio direction data and amplifying the first voice signals based on the first audio distance data;

receive second voice signals corresponding to the second agent identifier, wherein the second voice signals include second aural characteristics based on the second audio attribute data, the second aural characteristics aurally positioning the second voice signals based on the second audio direction data and amplifying the second voice signals based on the second audio distance data;

concurrently present the first voice signals and the second voice signals to the output port; and responsive to the supervisor identifier being moved to a new location in the user interface:
  determine third audio attribute data based on a change in the location of the first agent identifier with respect to the supervisor reference position, the third audio attribute data comprising third audio direction data and third audio distance data;
  provide to the 3DSAE the third audio attribute data;
  receive the first voice signals corresponding to the first agent identifier, wherein the first voice signals include third aural characteristics based on the third audio attribute data, the third aural characteristics aurally positioning the first voice signals based on the third audio direction data and amplifying the third voice signals based on the third audio distance data; and
  present the first voice signals to the output port.

6. The supervisor station of claim 5, wherein the first audio direction data is different from the second audio direction data.

7. The supervisor station of claim 5, wherein the first audio distance data is different from the second audio distance data.

8. A computer program product, comprising a non-transitory computer-usable medium having a computer-readable program code embodied therein, the computer-readable program code adapted to be executed on a processor to implement a method for controlling audio streams, the method comprising:

providing, by a computing device comprising a processor, a user interface on a display device, the user interface comprising a plurality of agent identifiers, including a first agent identifier and a second agent identifier, and a user-movable supervisor identifier having a supervisor reference position comprising a supervisor reference location and a supervisor reference direction;

providing to a three-dimensional spatial audio engine (3DSAE) first audio attribute data identifying a location of the first agent identifier in the user interface with respect to the supervisor reference position of the supervisor identifier, the first audio attribute data comprising first audio direction data based on the location of the first agent identifier with respect to the supervisor reference direction and first audio distance data based on the location of the first agent identifier with respect to the supervisor reference location;

providing to the 3DSAE second audio attribute data identifying a location of the second agent identifier in the user interface with respect to the supervisor reference position, the second audio attribute data comprising second audio direction data and second audio distance data;

receiving first voice signals corresponding to the first agent identifier, wherein the first voice signals include first aural characteristics based on the first audio attribute data, the first aural characteristics aurally positioning the first voice signals based on the first audio direction data and amplifying the first voice signals based on the first audio distance data;

receiving second voice signals corresponding to the second agent identifier, wherein the second voice signals include second aural characteristics based on the second audio attribute data, the second aural characteristics aurally positioning the second voice signals based on the second audio direction data and amplifying the second voice signals based on the second audio distance data;

concurrently presenting the first voice signals and the second voice signals to the output port; and responsive to the supervisor identifier being moved to a new location in the user interface:
  determining third audio attribute data based on a change in the location of the first agent identifier with respect to the supervisor reference position, the third audio attribute data comprising third audio direction data and third audio distance data:
  providing to the 3DSAE the third audio attribute data;
  receiving the first voice signals corresponding to the first agent identifier, wherein the first voice signals include third aural characteristics based on the third audio attribute data, the third aural characteristics aurally positioning the first voice signals based on the third audio direction data and amplifying the third voice signals based on the third audio distance data; and
  presenting the first voice signals to the output port.

9. The computer program product of claim 8, wherein the first audio direction data is different from the second audio direction data.

10. The computer program product of claim 8, wherein the first audio distance data is different from the second audio distance data.

* * * * *